(12) United States Patent
Yamamoto (10) Patent No.: US 7,528,527 B2
(45) Date of Patent: May 5, 2009

(54) DRIVING DEVICE

(75) Inventor: Takeshi Yamamoto, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 11 days.

(21) Appl. No.: 11/759,668

(22) Filed: Jun. 7, 2007

(65) Prior Publication Data

US 2007/0296308 A1 Dec. 27, 2007

(30) Foreign Application Priority Data

Jun. 22, 2006 (JP) ............................ 2006-172117

(51) Int. Cl.
*H01L 41/083* (2006.01)
(52) U.S. Cl. ..................... 310/328; 310/12; 310/13; 310/323.12
(58) Field of Classification Search ................. 310/328, 310/12, 13, 323.12
See application file for complete search history.

(56) References Cited

U.S. PATENT DOCUMENTS 6,433,459 B1 * 8/2002 Okada ......................... 310/317
6,841,920 B2 * 1/2005 Takamura et al. .......... 310/316.03
7,129,601 B2 * 10/2006 Brown et al. ................... 310/12

FOREIGN PATENT DOCUMENTS

| JP | H11-41953 A | 2/1999 |
|----|-------------|--------|
| JP | 2005-57907 A | 3/2005 |

* cited by examiner

*Primary Examiner*—Quyen P Leung
*Assistant Examiner*—Bryan P Gordon
(74) *Attorney, Agent, or Firm*—Global IP Counselors, LLP (57) ABSTRACT

A driving device includes a drive source, a driving unit, and a driven member. The drive source is configured and arranged to generate a driving force. The driving unit is coupled to the drive source to move with a reciprocating motion between first and second directions by the driving force. The driven member is arranged to frictionally engage with the driving unit to move in the first direction in response to the reciprocating motion of the driving unit. The driving unit is further arranged to convert a portion of the driving force into a pressing force that acts on the driven member in a direction substantially perpendicular to the first and second directions with a first conversion ratio when the driving unit moves in the first direction and with a second conversion ratio smaller than the first conversion ratio when the driving unit moves in the second direction.

15 Claims, 8 Drawing Sheets

DRIVING DEVICE

CROSS-REFERENCE TO RELATED APPLICATIONS

This application claims priority to Japanese Patent Application No. 2006-172117, filed on Jun. 22, 2006. The entire disclosure of Japanese Patent Application No. 2006-172117 is hereby incorporated herein by reference.

BACKGROUND OF THE INVENTION

1. Field of the Invention

The present invention relates to a driving device in which a driven member is moved to a prescribed direction by using a reciprocating motion of a drive source.

2. Background Information

Japanese Laid-Open Patent Application Publication No. H11-41953 discloses a conventional driving device in which a rod (driving member) and a slider (driven member) are frictionally engaged with a prescribed pressing force via a spring. This conventional driving device disclosed in this reference is configured to control a speed of expansion and contraction of a piezoelectric element (drive source) coupled to the rod. The slider is moved without slipping when the rod is moved in a low speed in a driving direction. On the other hand, the rod is moved in a high speed in a direction opposite the driving direction so that the rod slips on the slider due to an inertia force in the slider. Therefore, the slider is driven in one direction (in the driving direction) by the reciprocating motion of the rod. In such conventional driving device, since the pressing force is fixed regardless of the direction of movement of the rod during the reciprocating motion of the rod, when the rod moves in the direction opposite the driving direction, a relatively large energy is lost by the friction. However, if the pressing force is reduced in order to prevent the energy loss caused by the friction, slippage may occur between the rod and the slider due to the pressing force being insufficient.

Therefore, Japanese Laid-Open Patent Application Publication No. 2005-57907 discloses another conventional driving device in which an additional piezoelectric element is used instead of a spring for applying a pressing force to a slider so that the pressing force can be controlled according to the driving direction of a rod. More specifically, the conventional driving device disclosed in this reference is configured to control the additional piezoelectric element such that the pressing force is applied when the rod moves in the driving direction and the pressing force is not applied when the rod moves in the direction opposite the driving direction. Therefore, the energy loss due to the friction can be prevented.

In view of the above, it will be apparent to those skilled in the art from this disclosure that there exists a need for an improved driving device. This invention addresses this need in the art as well as other needs, which will become apparent to those skilled in the art from this disclosure.

SUMMARY OF THE INVENTION

In the conventional driving device in which the additional piezoelectric element is used to control the pressing force according to the driving direction of the rod, two separate drive sources and two separate electrical circuits for controlling the drive sources are required to drive two piezoelectric elements. Therefore, the cost of manufacturing and the size of the conventional driving device are increased. Moreover, it is necessary to supply power to the two piezoelectric elements, and thus, the power consumption of the conventional driving device is relatively large.

Therefore, one object of the present invention is to provide a driving device that is configured and arranged to suppress an energy loss and to provide a stabilized driving capability without increasing cost and size.

In order to achieve the above described object and other objects of the present invention, a driving device includes at least one drive source, at least one driving unit, and a driven member. The drive source is configured and arranged to generate a driving force. The driving unit is operatively coupled to the drive source to move with a reciprocating motion between first and second directions by the driving force from the drive source. The driven member is configured and arranged to frictionally engage with the driving unit to move in the first direction in response to the reciprocating motion of the driving unit. The driving unit is further configured and arranged to convert a portion of the driving force into a pressing force that acts on the driven member in a direction substantially perpendicular to the first and second directions with a first conversion ratio when the driving unit moves in the first direction and with a second conversion ratio that is smaller than the first conversion ratio when the driving unit moves in the second direction.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
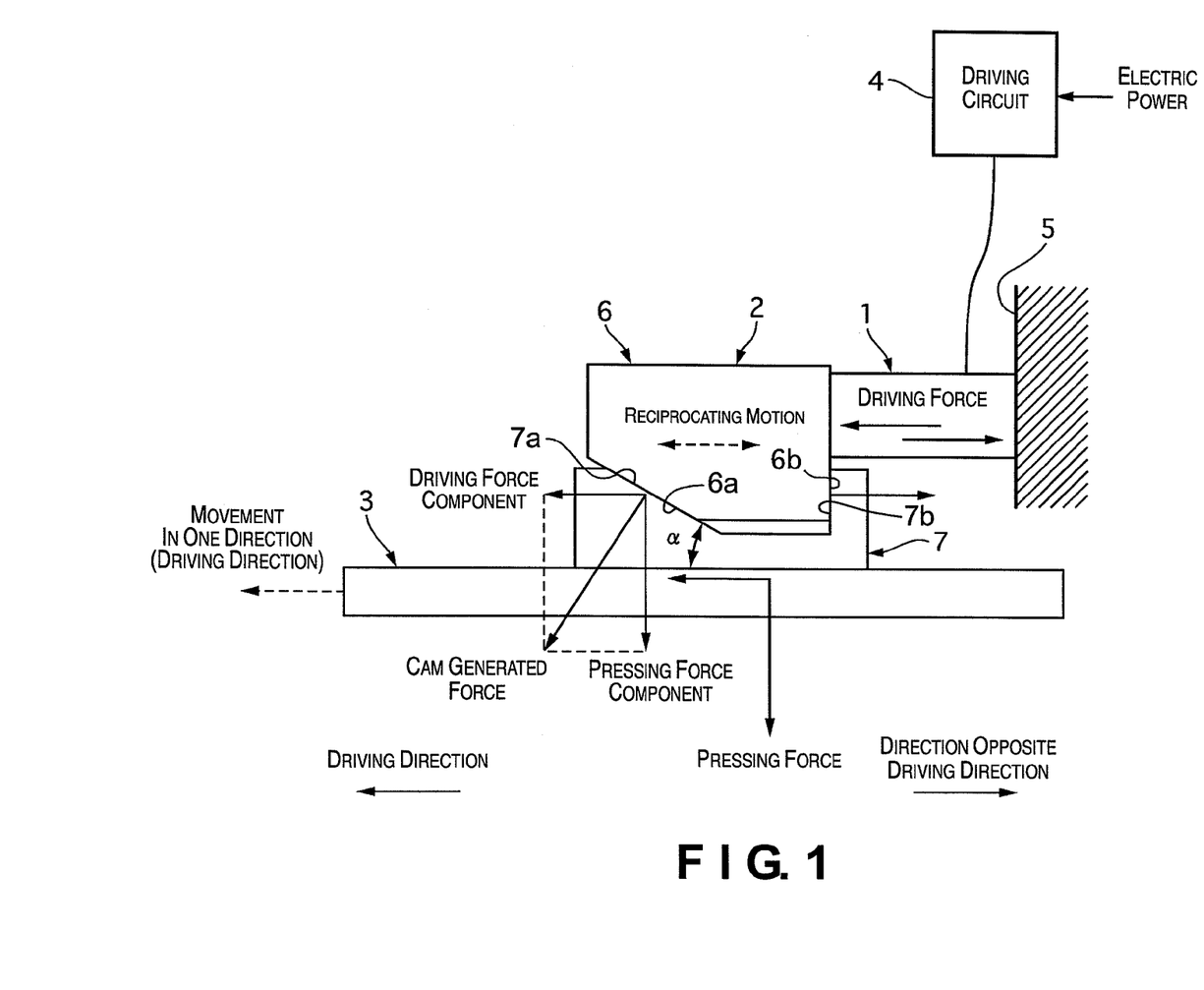
FIG. 1 is a simplified side elevational view of a driving device in accordance with a first embodiment of the present invention.

Referring initially to FIG. 1, a driving device is illustrated in accordance with a first embodiment of the present invention. FIG. 1 is a simplified side elevational view of the driving device of the first embodiment. As shown in FIG. 1, the driving device of the first embodiment includes a piezoelectric element 1, a driving unit 2, a driven member 3, and a driving circuit 4.

The driving circuit 4 is configured to control the piezoelectric element 1 to selectively move in a telescopic motion in an expansion/contraction direction (e.g., a horizontal (left-right) direction of FIG. 1). The piezoelectric element 1 includes first and second end portions spaced apart in the expansion/contraction direction. The first end portion of the piezoelectric element 1 is fixedly coupled to a fixing member 5, and the second end portion of the piezoelectric element 1 is coupled to the driving unit 2. The electric power is supplied to the piezoelectric element 1 from a power supply (not shown) via the driving circuit 4. The piezoelectric element 1 is a conventional component that is well known in the art. Since the piezoelectric element 1 is well known in the art, the structures of the piezoelectric element 1 will not be discussed or illustrated in detail herein. Rather, it will be apparent to those skilled in the art from this disclosure that the component can be any type of structure that can be used to carry out the present invention.

The driving unit 2 is configured and arranged to frictionally contact with the driven member 3 on a contacting surface (friction surface) that extends substantially parallel to the expansion/contraction direction of the piezoelectric element 1 when the driving unit 2 is moved in a driving direction (e.g., toward left side in FIG. 1). As seen in FIG. 1, the driving unit 2 includes a first member 6 and a second member 7. The first member 6 is mounted on the piezoelectric element 1, and the second member 7 includes the contacting surface that contacts the driven member 3 as shown in FIG. 1.

The first member 6 includes a first cam surface 6a and the second member 7 includes a second cam surface 7a that faces the first cam surface 6a. Also, the first member 6 includes a first force transmitting surface 6b and the second member includes a second force transmitting surface 7b that faces the first force transmitting surface 6b. The first and second cam surfaces 6a and 7a are arranged to form an angle $\alpha$ ($0<\alpha<90°$) with respect to the contacting surface of the second member 7 that contacts the driven member 3. The first and second force transmitting surfaces 6b and 7b are arranged to be substantially perpendicular (i.e., forming an angle equal to approximately 90°) with respect to the contacting surface of the second member 7 that contacts the driven member 3.

The first and second members 6 and 7 are coupled together such that the first and second cam surfaces 6a and 7a move in a direction toward each other when the first member 6 of the driving unit 2 is moved in the driving direction (e.g., a direction toward left side in FIG. 1), and move in a direction away from each other when the first member 6 is moved in the direction opposite the driving direction (e.g., a direction toward right side in FIG. 1). On the other hand, the first and second force transmitting surfaces 6b and 7b are arranged to move in a direction toward each other when the first member 6 of the driving unit 2 is moved in the direction opposite the driving direction (e.g., a direction toward right side in FIG. 1), and to move in a direction away from each other when the first member 6 is moved in the driving direction (e.g., a direction toward left side in FIG. 1).

The driving circuit 4 is configured to supply the piezoelectric element 1 with sinusoidal voltage having prescribed amplitude and frequency according to a prescribed command value. The piezoelectric element 1 is preferably configured and arranged to extend in the driving direction with the rising of the voltage and to retract with the falling of the voltage. Since a generative force per area of the piezoelectric element 1 is relatively large, a required force of the driving device can be obtained with a relatively small size of the piezoelectric element 1. In addition, the maximum electric current value can be set to a relatively small value by using the sinusoidal voltage as compared to when rectangular wave, triangular wave, and the like, are used. Therefore, the cost of the driving circuit 4 can be reduced with the driving device according to the first embodiment of the present invention.

Driving Operation of Driven Member

The driving unit 2 is configured and arranged to move back and forth due to the expansion and contraction of the piezoelectric element 1, and to transmit the driving force in the driving direction to the driven member 3 using the frictional force between the driving unit 2 and the driven member 3. Therefore, the driven member 3 is moved to the driving direction by the reciprocating motion of the driving unit 2. The operation of the force transmitted between the first member 6 and the second member 7 of the driving unit 2 will now be explained in more detail.

When the first member 6 is moved in the driving direction (e.g., a direction toward left side in FIG. 1), the first cam surface 6a of the first member 6 presses the second cam surface 7a of the second member 7. Thus, the driving force applied to the first member 6 by expansion of the piezoelectric element 1 in the driving direction is converted by the first and second cam surfaces 6a and 7a into a driving force component that is substantially parallel to the driving direction and a pressing force component that is substantially perpendicular to the driving direction. In other words, a cam generated force (the driving force component/$\sin \alpha$) generated in the second cam surface 7a of the second member 7 includes the driving force component and the pressing force component (the driving force component/$\tan \alpha$).

Therefore, when the first member 6 is moved in the driving direction by the piezoelectric element 1, the driving force component in the driving direction and the pressing force component (the driving force/$\tan \alpha$) in the perpendicular direction of the driving direction are applied to the second member 7 of the driving unit 2. More specifically, the pressing force component in the perpendicular direction is applied to the contacting surface between the second member 7 and the driven member 3. Therefore, it is possible to transmit the driving force to the driven member 3 if a friction coefficient of the contacting surface is higher than the value $\tan \alpha$.

On the other hand, when the first member 6 is moved in the direction opposite the driving direction (e.g., a direction toward right side in FIG. 1) by the piezoelectric element 1, the first force transmitting surface 6b of the first member 6 draws back the second force transmitting surface 7b of the second member 7 toward the piezoelectric element 1. In such case, since the first and second force transmitting surfaces 6b and 7b are arranged to be substantially perpendicular (i.e., form an angle equal to approximately 90°) with respect to the contacting surface between the second member 7 and the driven member 3, the pressing force component is equal to zero (i.e., the pressing force component=the driving force component/tan 90°=0). In other words, the frictional force is not generated between the second member 7 and the driven member 3, and thus, the driving force in the direction opposite the driving direction is not transmitted to the driven member 3.

Therefore, with the driving device of the first embodiment, only the driving force in the driving direction is transmitted from the driving unit 2 to the driven member 3. Since the frictional force is not generated between the second member 7 and the driven member 3, the energy loss due to the movement of the driving unit 2 in the direction opposite the driving direction can be prevented. Accordingly, the driving device of the first embodiment can efficiently convert the driving force of the piezoelectric element 1 into the movement of the driven member 3 in the driving direction.

Moreover, in the first embodiment, since a portion of the driving force of the piezoelectric element 1 is converted into the pressing force component (a perpendicular direction component) by using the first and second cam surfaces 6a and 7a, it is possible to efficiently control the pressing force by using only one piezoelectric element 1 that is used to reciprocate the driving unit 2.

Conversion Operation from Driving Force to Pressing Force via Cam Surfaces

In the driving device, the direction of the driving force and the direction of movement of the driven member 3 are not always the same because the driving unit 2 reciprocates (i.e., moves back and forth) using the expansion and contraction movements of the piezoelectric element 1. In the driving device of the first embodiment, the driven member 3 is arranged to frictionally contact the driving unit 2 only when the driving unit 2 moves in the driving direction by using the first and second cam surfaces 6a and 7a. More specifically, the driving device of the first embodiment is configured and arranged to drive the driven member 3 in the driving direction only when a relative speed of the driving unit 2 with respect to the driven member 3 is a positive value in the driving direction.

Figure 2:
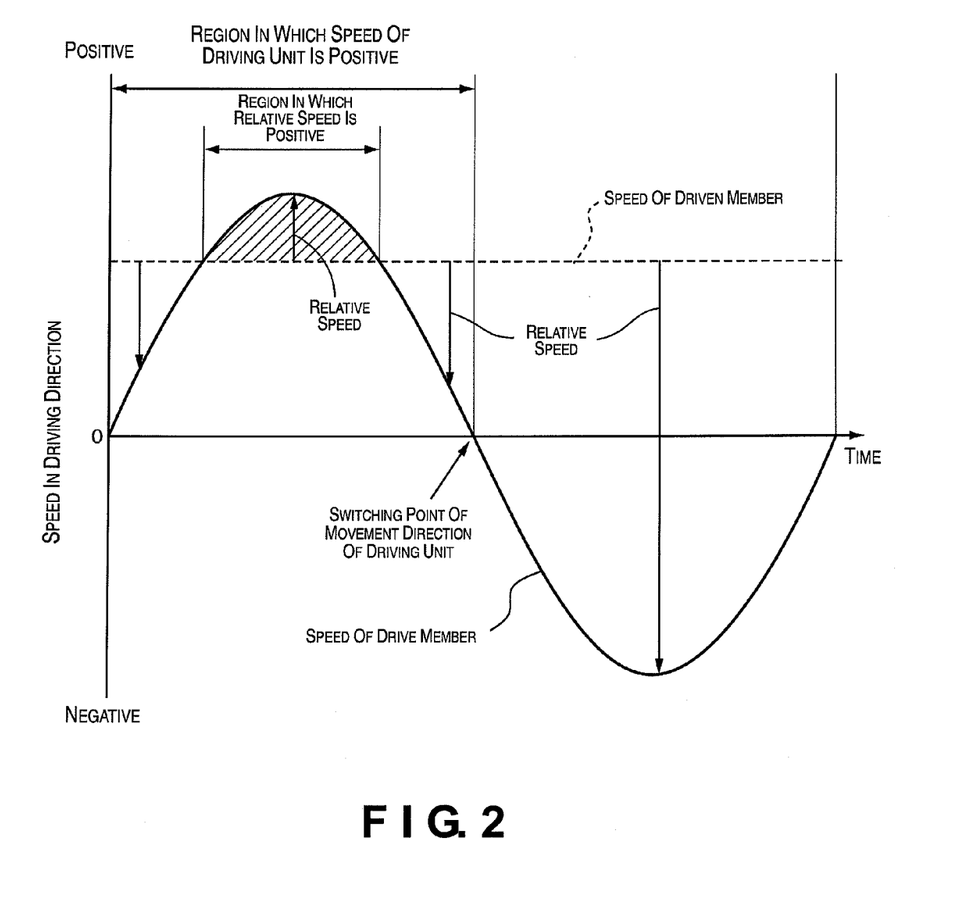
FIG. 2 is a diagrammatic chart illustrating a change over time in speed of a driving member and a driven member of the driving device in accordance with the first embodiment of the present invention.

FIG. 2 is a diagrammatic chart illustrating a change over time in speed of the driving member 2 and the driven member 3. In FIG. 2, the speed in the driving direction is shown as a positive value and the speed in the direction opposite the driving direction is shown as a negative value. In a left-half region (i.e. an area that the speed of the driving unit 2 is a positive value) of FIG. 2, the piezoelectric element 1 extends and the driving unit 2 moves to the driving direction (e.g., toward a left side in FIG. 1). In a right-half region of FIG. 2, the piezoelectric element 1 contracts and moves to the direction opposite the driving direction (e.g., toward a right side in FIG. 1), and thus, the speed of the driving unit 2 becomes a negative value. In FIG. 2, the driven member 3 is assumed to be moved at an approximately constant speed for the sake of simplicity.

When the relative speed of the driving unit 2 with respect to the driven member 3 in the driving direction (i.e., a value obtained by subtracting the speed of the driven member 3 from the speed of the driving unit 2) is a positive value, the frictional force is generated between the driving unit 2 and the driven member 3 in the driving direction. On the other hand, when the relative speed of the driving unit 2 with respect to the driven member 3 is a negative value, the frictional force is generated in the direction opposite the driving direction. Therefore, it is preferable to apply the pressing force from the first member to the second member 7 only during the period that the relative speed of the driving unit 2 with respect to the driven member 3 in the driving direction is a positive value. However, the region in which the relative speed of the driving unit 2 with respect to the driven member 3 in the driving direction is a positive value varies depending on the operating conditions.

In the conventional driving device disclosed in the Japanese Laid-Open Patent Application Publication No. 2005-57907, in addition to the piezoelectric element that is used to reciprocate the rod, the additional piezoelectric element is provided to control the contact pressure of the rod to the slider to adjust the pressing force according to the driving direction of the slider to limit the moving direction of the slider to one direction. In such conventional driving device, voltage is applied to the additional piezoelectric element at the time of rise of the voltage waveform applied to the first piezoelectric element in order to reduce the energy loss. However, in such conventional driving device, the pressing force has been already generated by the time that the relative speed of the rod with respect to the slider changes from negative to positive with respect to the driving direction. In other words, since the pressing force is not generated according to the relative speed of the rod with respect to the slider in the conventional driving device, the energy loss occurs in such conventional driving device.

On the other hand, with the driving device of the first embodiment, the driving unit 2 is divided into the first member 6 and the second member 7 having the first and second cam surfaces 6a and 7a, respectively. Thus, a portion of the driving force from the piezoelectric element 1 is converted into the pressing force component (the driving force component/tan α) of the cam generated force by the first and second cam surfaces 6a and 7a and applied on the second member 7 and the driven member 3 as the pressing force when the first member 6 moves in the driving direction. On the other hand, the driving force from the piezoelectric element 1 is transmitted to the driven member 3 by the first and second force transmitting surfaces 6b and 7b without a portion of the driving force being converted into a pressing force component (a perpendicular direction component) when the first member 6 moves in the direction opposite the driving direction.

In other words, in the first embodiment, a portion of the driving force is converted into the pressing force component via the first and second cam surfaces 6a and 7a only when the relative speed of the driving unit 2 with respect to the driven member 3 is a positive value. A portion of the driving force is not converted into the pressing force component when the relative speed of the driving unit 2 with respect to the driven member 3 is a negative value or zero. Therefore, in first embodiment, whether or not the pressing force is imparted to the second member 7 and the driven member 3 is based on the movement direction of the drive unit 2 (the direction of the driving force of the piezoelectric element 1) because of the shape (inclination angle) of the first and second cam surfaces 6a and 7a. The movement direction of the driving unit 2 (i.e., in the driving direction or in the direction opposite the driving direction) and the polarity (i.e., positive value or negative value) of the relative speed of the driving unit 2 with respect to the driven member 3 always match. In other words, the movement direction of the drive unit 2 is always in the driving direction when the relative speed of the driving unit 2 with respect to the driven member 3 in the driving direction is a positive value. Thus, it is possible to accurately determine whether or not the pressing force needs to be applied to the second member 7 and the driven member 3. Therefore, it is possible to suppress the energy loss to a value close to zero.

Accordingly, the driving device according to the first embodiment of the present invention includes the driven member 3 that is movable in a predetermined direction (i.e., the driving direction), the driving unit 2 that frictionally engages with the driven member 3 by the pressing force in the perpendicular direction with respect to the predetermined direction, and the piezoelectric element 1 configured and arranged to input the driving force in the driving unit 2 in order to move the driving unit 2 back and forth in the predetermined direction. The driving unit 2 is configured to convert a portion of the driving force into the pressing force component at a first conversion ratio in a first direction (i.e., the driving direction) of the reciprocating motion of the driving unit 2. On the other hand, the driving unit 2 is configured to convert a portion of the driving force into the pressing force component at a second conversion ratio that is smaller than the first conversion ratio in a second direction (i.e., the direction opposite the driving direction). In other words, the driving unit 2 is configured and arranged to change the conversion ratio for converting the portion of the driving force from the piezoelectric element 1 into the pressing force between when the driving unit 2 moves in the driving direction and when the driving unit 2 moves in the direction opposite the driving direction. Thus, the pressing force can be appropriately controlled by using only one piezoelectric element 1. As a result, it is possible to suppress the energy loss and to achieve a stabilized driving capability without increasing cost and size of the driving device.

Moreover, in the first embodiment, the driving unit 2 is configured and arranged to covert the portion of the driving force with the second conversion ratio that is equal to zero when the driving unit 2 moves in the direction opposite the driving direction. Therefore, the portion of the driving force from the piezoelectric element 1 is not converted into the pressing force. Thus, it is possible to significantly reduce the energy loss.

The driving unit 2 is further configured and arranged to convert the portion of the driving force into the pressing force when the relative speed of the driving unit 2 in the driving direction with respect to the driven member 3 is a positive value. When the relative speed in the driving direction is a negative value or zero, the driving force from the piezoelectric element 1 is not converted into the pressing force. Therefore, the driving force from the piezoelectric element 1 in the direction opposite the driving direction will not have an effect on the driven member 3, and it is possible to reduce the energy loss.

The driving unit 2 includes the first member 6 coupled to the piezoelectric element 1 and the second member 7 configured and arranged to frictionally engage with the driven member 3. The first and second members 6 and 7 include the first and second cam surfaces 6a and 7a that face each other and configured and arranged to convert the portion of the driving force into the pressing force when the relative speed of the first member 6 with respect to the driven member 3 is a positive value with respect to the driving direction. As a result, it is possible to convert the portion of the driving force into the pressing force with a simple structure. In addition, it is possible to apply appropriate pressing force in accordance with the direction and magnitude of the driving force from the piezoelectric element 1 without using a complicated control.

The first and second members 6 and 7 of the driving unit 2 include the first and second force transmitting surfaces 6b and 7b that face each other and configured and arranged to transmit the driving force to the second member 7 from the first member 6 when the relative speed of the first member 6 with respect to the driven member 3 in the driving direction is a negative value. As a result, it is possible to control the energy loss by setting the pressing force to zero with a simple structure when the driving unit 2 moves in the direction opposite the driving direction.

Since the piezoelectric element 1 is used as the drive source for reciprocating the driving unit 2 in the first embodiment of the present invention, it is possible to reduce the size of the driving device.

Since the voltage waveform supplied to the piezoelectric element 1 is sinusoidal wave, it is possible to reduce the maximum electric current, to reduce the size of the electric circuit (the driving circuit 4), and to reduce the cost of the driving device.

Second Embodiment

Figure 3:
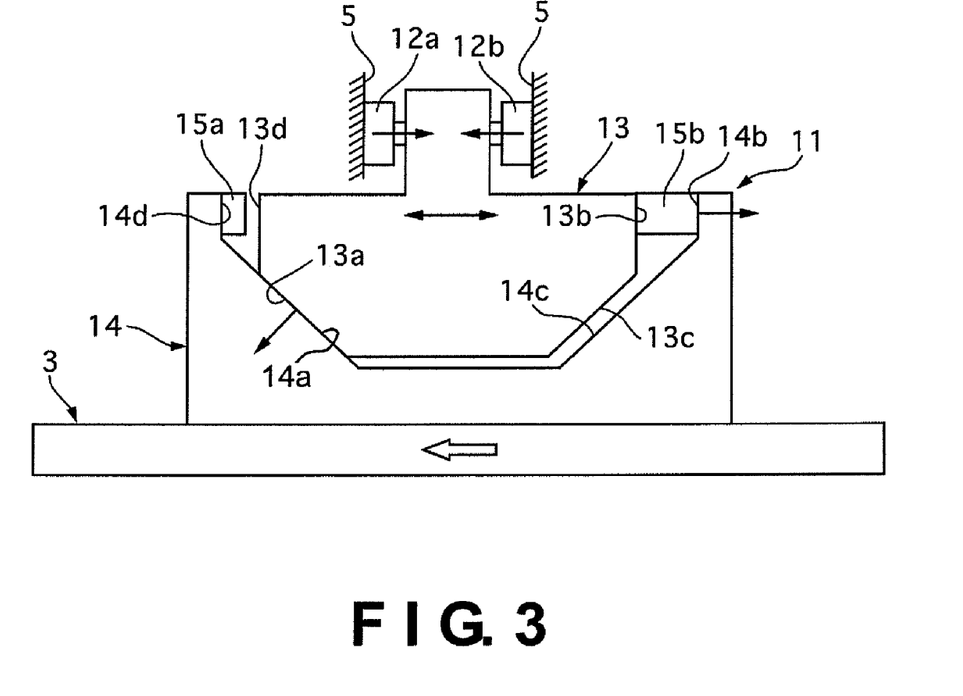
FIG. 3 is a simplified side elevational view of a driving device in accordance with a second embodiment of the present invention.

Referring now to FIG. 3, a driving device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The driving device of the second embodiment differs from the driving device of the first embodiment in that a driving unit 11 of the driving device of the second embodiment is configured and arranged to selectively switch the driving direction of the driven member 3.

FIG. 3 is a simplified side elevational view of the driving device in accordance with the second embodiment of the present invention. As shown in FIG. 3, the driving device of the second embodiment includes the driving unit 11, a pair (left and right) of piezoelectric elements 12a and 12b, the driven member 3 and the driving circuit 4. The driving unit 11 has a protrusion that is disposed between the left and right piezoelectric elements 12a and 12b, which are supported by the fixing member 5. Although not shown in FIG. 1, the left and right piezoelectric elements 12a and 12b are configured and arranged to be supplied with an electric power from a power supply via a driving circuit.

The driving unit 11 includes a first member 13 and a second member 14 as shown in FIG. 3. The first member 13 includes a pair of left and right first cam surfaces 13a and 13c and a pair of left and right force transmitting surfaces 13b and 13d. The second member 14 includes a pair of left and right second cam surfaces 14a and 14c and a pair of left and right second force transmitting surfaces 14b and 14d.

Moreover, the driving unit 11 includes a pair of left and right switching elements 15a and 15b disposed between the left side first and second force transmitting surfaces 13d and 14d, and the right side first and second force transmitting surfaces 13b and 14b, respectively. The left and right switching elements 15a and 15b are configured and arranged to selectively expand and contract between the first and second members 13 and 14. The left switching element 15a is controlled to retract when the driving direction of the driven member 3 is toward the left side in FIG. 3, and to extend when the driving direction of the driven member 3 is toward the right side in FIG. 3. The right switching element 15b is controlled to extend when the driving direction of the driven member 3 is toward the left side in FIG. 3, and to retract when the driving direction of the driven member 3 is toward the right side in FIG. 3. FIG. 3 illustrates a state in which the driving direction of the driven member 3 is toward the left side in FIG. 3.

Moreover, the drive unit 11 is configured and arranged such that when the left switching element 15a extends and the right switching element 15b retracts, the right side first and second cam surfaces 13c and 14c contact with each other and the left side first and second force transmitting surfaces 13d and 14d are connected via the left switching element 15a.

On the other hand, the drive unit 11 is configured and arranged such that when the left switching element 15a retracts and the right switching element 15b extends, the left side first and second cam surfaces 13a and 14a contact with each other and the right side first and second force transmitting surfaces 13b and 14b are connected via the right switching element 15b as shown in FIG. 3.

Switching Operation of Driving Direction

In the driving device of the second embodiment, the driving direction of the driven member 3 is set as the same direction as the first embodiment (e.g., toward the left side of FIG. 3) by extending the right switching element 15b and retracting the left switching element 15a as shown in FIG. 3. In such state, the left side first and second cam surfaces 13a and 14a contact each other as shown in FIG. 3, and the right side first and second force transmitting surfaces 13b and 14b are connected with each other via the right switching element 15b. Since the left switching element 15a is retracted, a gap is formed between the right side first and second cam surfaces 13c and 14c, and the left side first and second force transmitting surfaces 13d and 14d are not connected. In this state, by expanding and contracting the left and right piezoelectric elements 12a and 12b in a phase opposite each other to reciprocate the driving unit 11, only the frictional force of the direction toward the left side in FIG. 3 is transmitted to the driven member 3 similarly to the first embodiment explained above. Therefore, it is possible to drive the driven member 3 in the driving direction (e.g., toward the left side in FIG. 3) with a high efficiency.

On the other hand, the driving direction of the driven member 3 is set as the opposite direction from the first embodiment (e.g., toward the right side of FIG. 3) by extending the left switching element 15a and retracting the right switching element 15b. In such state, the right side first and second cam surfaces 13c and 14c contact each other, and the left side first and second force transmitting surfaces 13d and 14d are connected with each other via the left switching element 15a. Since the right switching element 15b is retracted, a gap is formed between the left side first and second cam surfaces 13a and 14a, and the right side first and second force transmitting surfaces 13b and 14b are not connected. In this state, by expanding and contracting the left and right piezoelectric elements 12a and 12b in a phase opposite each other to reciprocate the driving unit 11, only the frictional force of the direction toward the right side in FIG. 3 is transmitted to the driven member 3 similarly to the first embodiment explained above. Therefore, it is possible to drive the driven member 3 in the driving direction (e.g., toward the right side in FIG. 3) with a high efficiency.

In other words, the driving device of the second embodiment is configured and arranged to easily switch the driving direction of the driven member 3 by switching the expansion and contraction states of the left and right switching elements 15a and 15b.

In addition to the similar effects obtained by the driving device of the first embodiment, the driving device of the second embodiment can selectively set the moving direction of the driven member 3. Thus, it is possible to expand the scope of application as the driving device of the present invention to a driving device configured and arranged to perform reverse driving operation.

Third Embodiment

Figure 4:
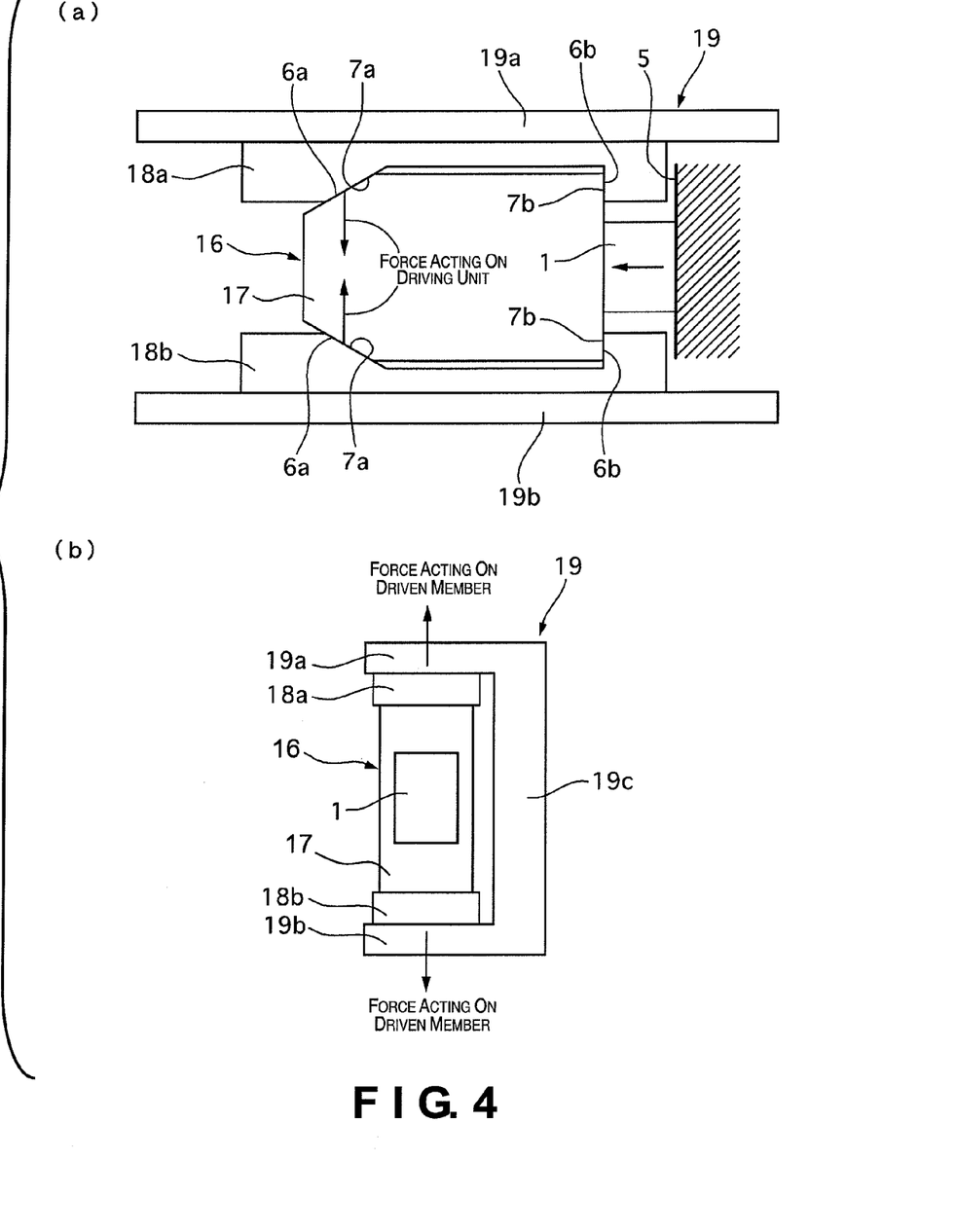
FIG. 4 is a pair of diagrams (a) and (b) illustrating a simplified side elevational view (the diagram (a)) of a driving device and a simplified rear elevational view (the diagram (b)) of the driving device in accordance with a third embodiment of the present invention.

Referring now to FIG. 4, a driving device in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The driving device of the third embodiment differs from the driving device of the first embodiment in that a driving unit 16 and a driven member 19 of the driving device of the third embodiment are configured and arranged such that a reaction force of the pressing force is cancelled out.

FIG. 4 is a pair of diagrams (a) and (b) illustrating a simplified side elevational view (the diagram (a)) of the driving device and a simplified rear elevational view (the diagram (b)) of the driving device in accordance with the third embodiment. As shown in the diagrams (a) and (b) of FIG. 4, the driving device of the third embodiment includes the piezoelectric element 1, the driving unit 16 and the driven member 19.

The driving unit 16 of the third embodiment includes a first member 17 and a pair of top and bottom second members 18a and 18b as shown the diagrams (a) and (b) of FIG. 4. The driving unit 16 has a structure in which an additional pair of the driving unit 2 and the driven member 3 of the first embodiment (FIG. 1) is arranged symmetrically with respect to an upper surface of the driving unit 2 of FIG. 1 with the two driving units 2 being connected together to form the driving unit 16 of the third embodiment and the two driven members 3 being connected together to form the driven member 19 of the third embodiment as shown in the diagram (b) of FIG. 4. More specifically, the first member 17 of the driving unit 16 includes a pair (top and bottom) of the first cam surfaces 6a and a pair (top and bottom) of the first force transmitting surfaces 6b. Each of the top and bottom second members 18a and 18b includes the second cam surface 7a and the second force transmitting surface 7b.

The driven member 19 includes an upper portion 19a, a lower portion 19b and a connecting portion 19c extending between the upper and lower portions 19a and 19b as shown in the diagram (b) of FIG. 4. The driving unit 16 is disposed between the upper and lower portions 19a and 19b as shown in the diagram (a) of FIG. 4. the as shown in the diagram (a) of FIG. 4. The upper and lower portions 19a and 19b and the connecting portion 19c of the driven member 19 form a generally horseshoe shape cross section (the diagram (b) of FIG. 4) avoiding the driving unit 16.

Force Cancelling Operation in Pressing Force Direction

In the equilibrium of force acting on the driving unit 2 of the first embodiment explained above, the driving force component (FIG. 1) of the cam generated force in the first and second cam surfaces 6a and 7a is counterbalanced by the driving force from the piezoelectric element 1. However, there is no force acting on the driving unit 2 that counterbalances the pressing force component (FIG. 1) of the cam generated force in the first and second cam surfaces 6a and 7a. Therefore, in the first embodiment, it is preferable to support the driving unit 2 by a fixed supporting object via a bearing and the like. Likewise, it is preferable to support the pressing force acting on the driven member 3 in the first embodiment. Thus, in the first embodiment, the frictional loss may occur in each of the supporting portions.

On the other hand, in the third embodiment, the driving unit 16 is configured and arranged to cancel out the pressing force components (perpendicular direction components) that are acting on the first member 17 by imparting the pressing force components of the same magnitude from the second members 18a and 18b in opposite directions from each other. In addition, the driving unit 16 is configured and arranged to cancel out the pressing force components (perpendicular direction components) that are acting on the driven member 19 by imparting the pressing force components of the same magnitude from the second members 18a and 18b in opposite directions from each other.

In other words, since both the pressing force components that are imparting on the driving unit 16 (the first member 17) and the driven member 19 are canceled out in the third embodiment, it is not necessary to arrange support portions for the driving unit 16 and the driven member 19. Therefore, it is possible to prevent frictional loss due to frictional sliding and the like with the support portions from occurring.

In addition to the similar effects obtained by the driving device of the first embodiment, the driving unit 16 and the driven member 19 of the driving device of the third embodiment are configured and arranged to cancel out that reaction forces of the pressing forces. Therefore, it is not necessary to provide structures for supporting the reaction forces of the pressing forces that are imparted on the driving unit 16 and the driven member 19. Thus, it is possible to avoid frictional loss due to the sliding at the support portions.

Fourth Embodiment

Figure 5:
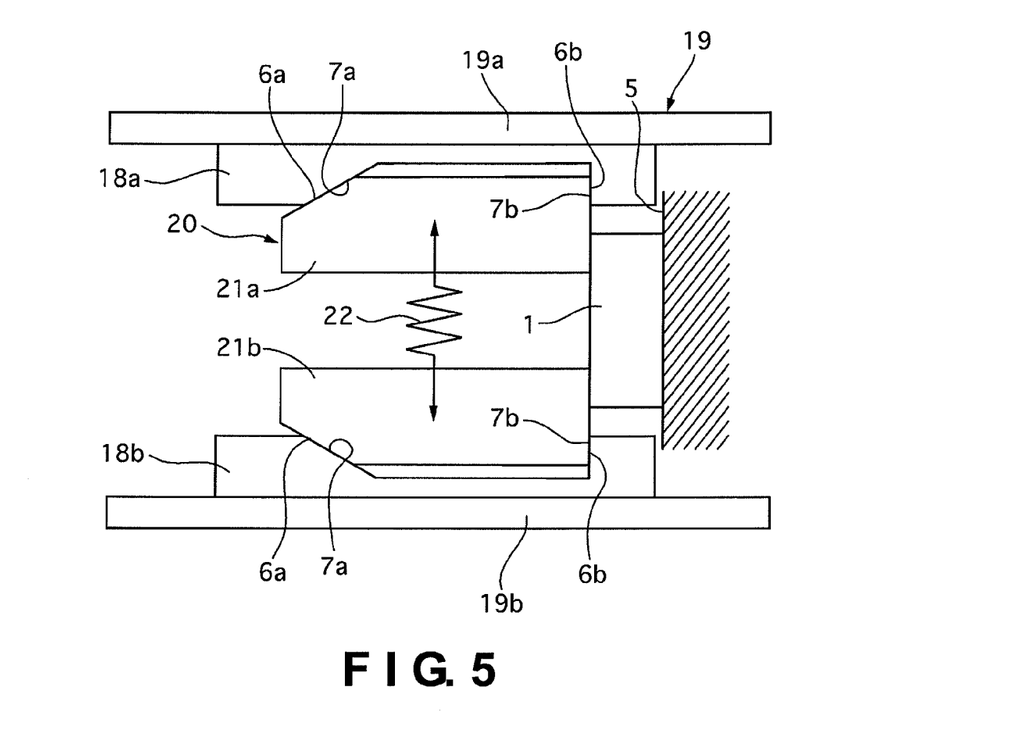
FIG. 5 is a simplified side elevational view of a driving device in accordance with a fourth embodiment of the present invention.
Figure 6:
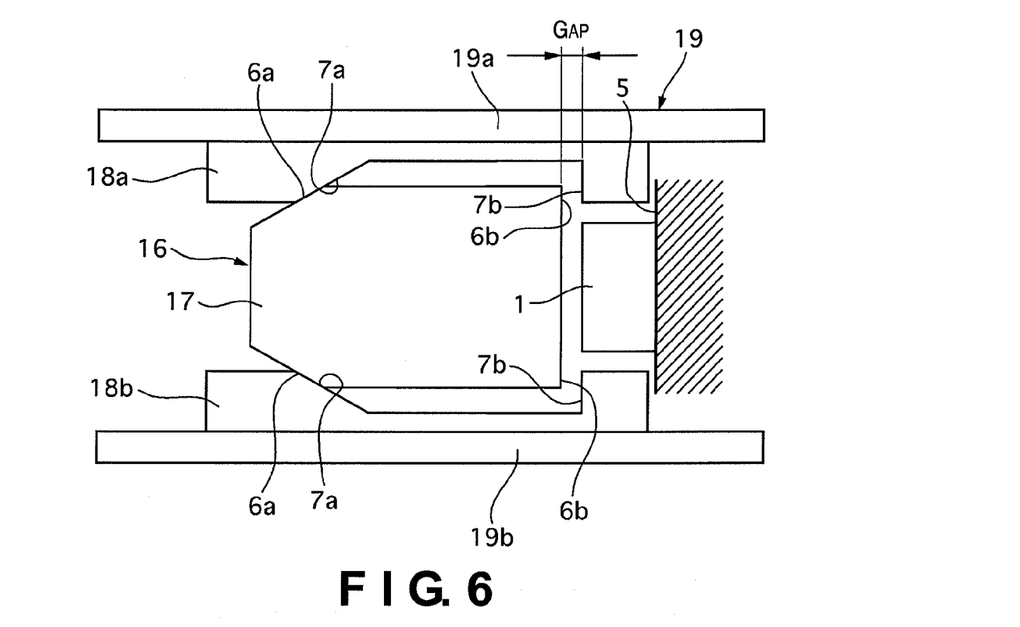
FIG. 6 is a simplified side elevational view of a driving device in accordance with a comparison example in which a backlash occurs in the driving device.

Referring now to FIGS. 5 and 6, a driving device in accordance with a fourth embodiment will now be explained. In view of the similarity between the third and fourth embodiments, the parts of the fourth embodiment that are identical to the parts of the third embodiment will be given the same reference numerals as the parts of the third embodiment. Moreover, the descriptions of the parts of the fourth embodiment that are identical to the parts of the third embodiment may be omitted for the sake of brevity.

The driving device of the fourth embodiment is basically identical to the driving device of the third embodiment except that a spring 22 (pressing force generating part) is provided in a driving unit 20 to impart the pressing force to the driven member 19.

FIG. 5 is a simplified side elevational view of the driving device in accordance with the fourth embodiment. In fourth embodiment, the first member 17 of the third embodiment is divided into upper and lower first members 21a and 21b and the spring 22 (pressing force generating part) is arranged between the upper and lower first members 21a and 21b. The spring 22 is configured and arranged to impart the pressing forces in the perpendicular direction on the upper and lower first members 21a and 21b.

In the fourth embodiment, an example is shown in which the driving unit 20 is divided into the upper and lower first members 21a and 21b, and the spring 22 is inserted between the upper and lower first members 21a and 21b. However, the position in which the spring 22 is inserted can be at a position, such as between the first and second force transmitting surfaces 6b and 7b or on the connection portion 19c of the driven member 19. In addition, a spring or the like may be provided in the driving device of the first embodiment illustrated in FIG. 1 in the support portions of the driving unit 2 and the driven member 3 and the like.

Backlash Preventing Operation

In the third embodiment, as shown in FIG. 4, the first and second cam surfaces 6a and 7a formed at top and bottom locations and the first and second force transmitting surfaces 6b and 7b formed at top and bottom locations are all in contact with corresponding surfaces without any gaps. However, when there is a dimension error or the like as shown in the comparison example in FIG. 6, a gap is formed between the first and second force transmitting surfaces 6b and 7b (i.e., between the first member 17 and the piezoelectric element 1). When such gap is formed, the gap becomes a backlash with respect to the displacement of the piezoelectric element 1 and the driving unit 16, and thus, the displacement (movement) of the driven member 19 becomes relatively small. In such case, the movement speed of the driven member 19 obtained by the driving device becomes relatively small.

On the other hand, in the driving device of the fourth embodiment, each of the upper and lower first members 21a and 21b is urged by the spring 22 toward the upper and lower portions 19a and 19b of the driven member 19. Therefore, it is possible to prevent gaps being formed due to a dimension error and the like. In addition, since the force of the spring 22 is relatively small, the frictional loss toward the direction opposite the driving direction can be limited.

In addition to the similar effects obtained by the driving devices of the first and third embodiments, the driving device of the fourth embodiment can prevent the backlash (gaps) in contacting portions between the piezoelectric element 1 an the driving unit 20 and the driven member 19 because the driving unit 20 is provided with the spring 22 configured and arranged to apply the pressing force to the driven member 19.

Fifth Embodiment

Figure 7:
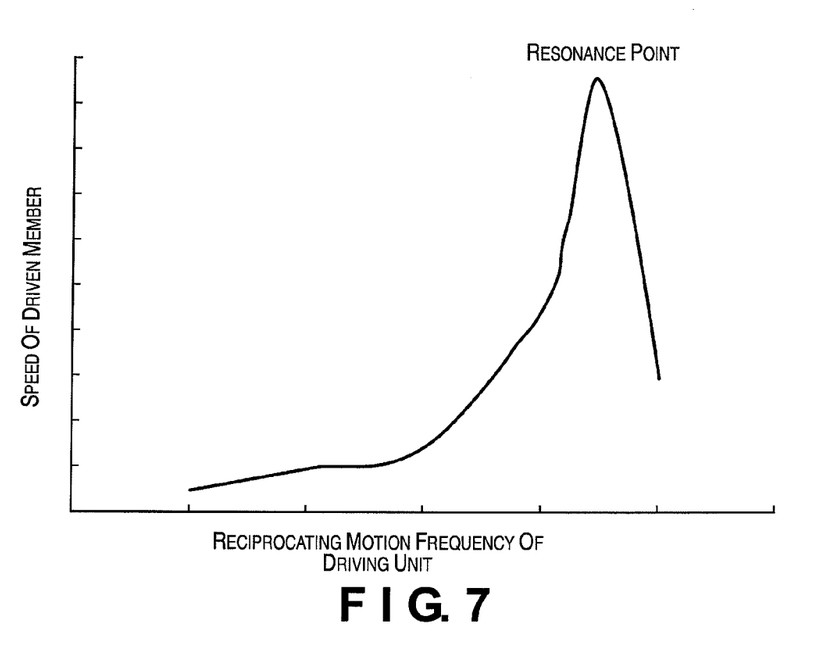
FIG. 7 is a diagrammatic chart illustrating a speed of a driven member with respect to a reciprocating motion frequency of a driving member of a driving device in accordance with a fifth embodiment of the present invention.

Referring now to FIG. 7, a driving device in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The structure of the driving device of the fifth embodiment is basically the same as the structure of the driving device of the first embodiment illustrated in FIG. 1. Thus, the descriptions of the structure of the driving device are omitted for the sake of brevity. In the fifth embodiment, the driving circuit 4 (FIG. 1) is configured to control the frequency of the reciprocating motion of the driving unit 2 to a frequency in a region close to the resonance frequency of the system (driving device).

Speed Increasing Operation Using Resonance Frequency Region

FIG. 7 is a diagrammatic chart illustrating a calculated speed of the driven member 3 (FIG. 1) with respect to a reciprocating motion frequency of the driving unit 2 (FIG. 1) of the driving device in accordance with the fifth embodiment. As shown in FIG. 7, the speed of the driven member 3 increases rapidly in a region including a prescribed frequency, which illustrates the resonance phenomenon. Therefore, by providing the piezoelectric element 1 with a voltage waveform with a frequency in this resonance frequency region, it is possible to move the driven member 3 with a high speed. Thus, the usage of the driving device can be increased.

In addition to the similar effects obtained by the driving device of the first embodiment, the driving device of the fifth embodiment can move the driven member 3 in a high speed, and thus, the usage thereof can be increased because the piezoelectric element 1 is controlled so that the reciprocating motion of the driving unit 2 matches the resonance motion of the driving device.

Sixth Embodiment

Figure 8:
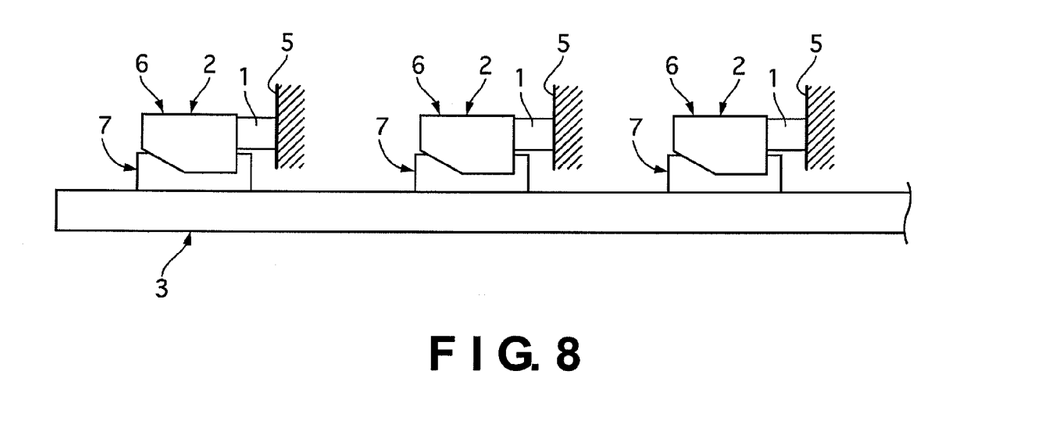
FIG. 8 is a simplified side elevational view of a driving device in accordance with a sixth embodiment of the present invention.
Figure 9:
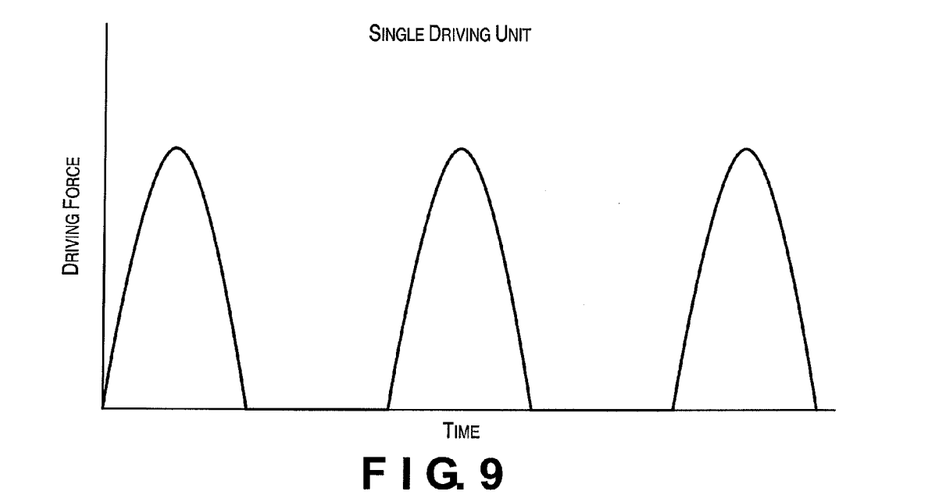
FIG. 9 is a diagrammatic chart illustrating a change in a driving force of a driving device in a case where a single drive source is provided in the driving device.
Figure 10:
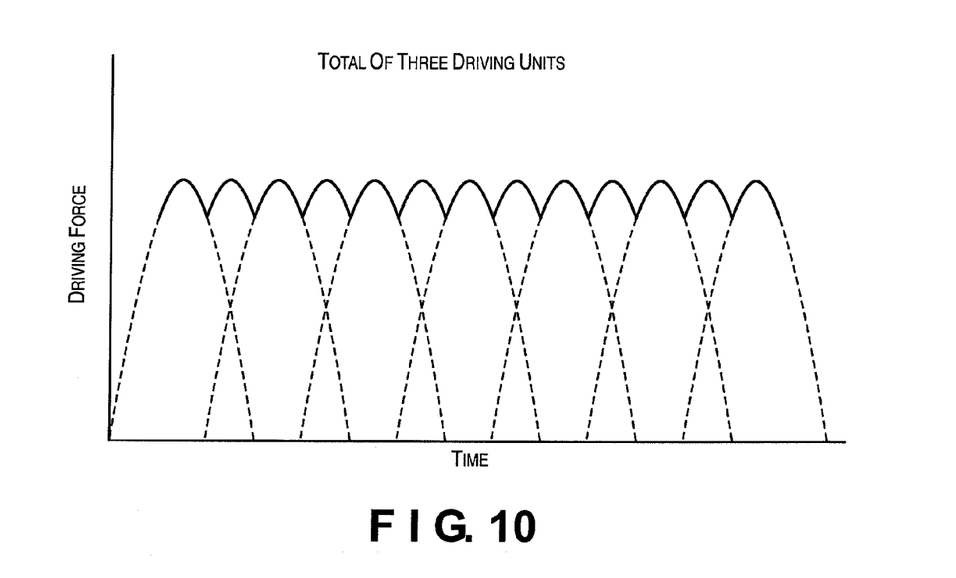
FIG. 10 is a diagrammatic chart illustrating a change in a driving force of the driving device in accordance with the sixth embodiment of the present invention.

Referring now to FIGS. 8 to 10, a driving device in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The driving device of the sixth embodiment is differs from the driving device of the first embodiment in that the driving device includes a plurality of driving units 2 and a plurality of piezoelectric elements 1 to move the driven member 3.

FIG. 8 is a simplified side elevational view of the driving device in accordance with the sixth embodiment. As shown in FIG. 8, the driving device of the sixth embodiment includes three driving units 2 coupled to the driven member 3. As in the first embodiment, the piezoelectric elements 1 are configured and arranged to be supplied with an electrical power from a power supply via a driving circuit (or driving circuits). The phase of each sinusoidal voltage provided to each of the piezoelectric elements 1 is shifted 120° with respect to each other.

When only one driving unit 2 is provided in the driving device as in the first embodiment, force is not generated to move the driven member 3 in the driving direction when the driving unit 2 is moving in the direction opposite the driving direction. Thus, changes (fluctuation) occur in the driving force of the driven member 3 as shown in FIG. 9. Such fluctuation in the driving force is not preferable because it may cause vibration in the driving device.

On the other hand, in the driving device of the sixth embodiment, since three driving units 2 are reciprocated with the phases shifted 120° respectively, even when one of the driving units 2 does not generate a sufficient amount of the driving force to move the driven member 3, the other two driving units 2 will generate the driving force. In other words, the total amount of driving force generated by each of the driving units 2 can achieve a substantially constant (smooth) driving force as shown in FIG. 10. Therefore, it is possible to reduce speed changes in the driven member 3.

In addition to the similar effects obtained by the driving device of the first embodiment, the driving unit of sixth embodiment can reduce speed changes in the driven member 3 by providing a plurality of the driving units 2 to move the driven member 3.

Seventh Embodiment

Figure 11:
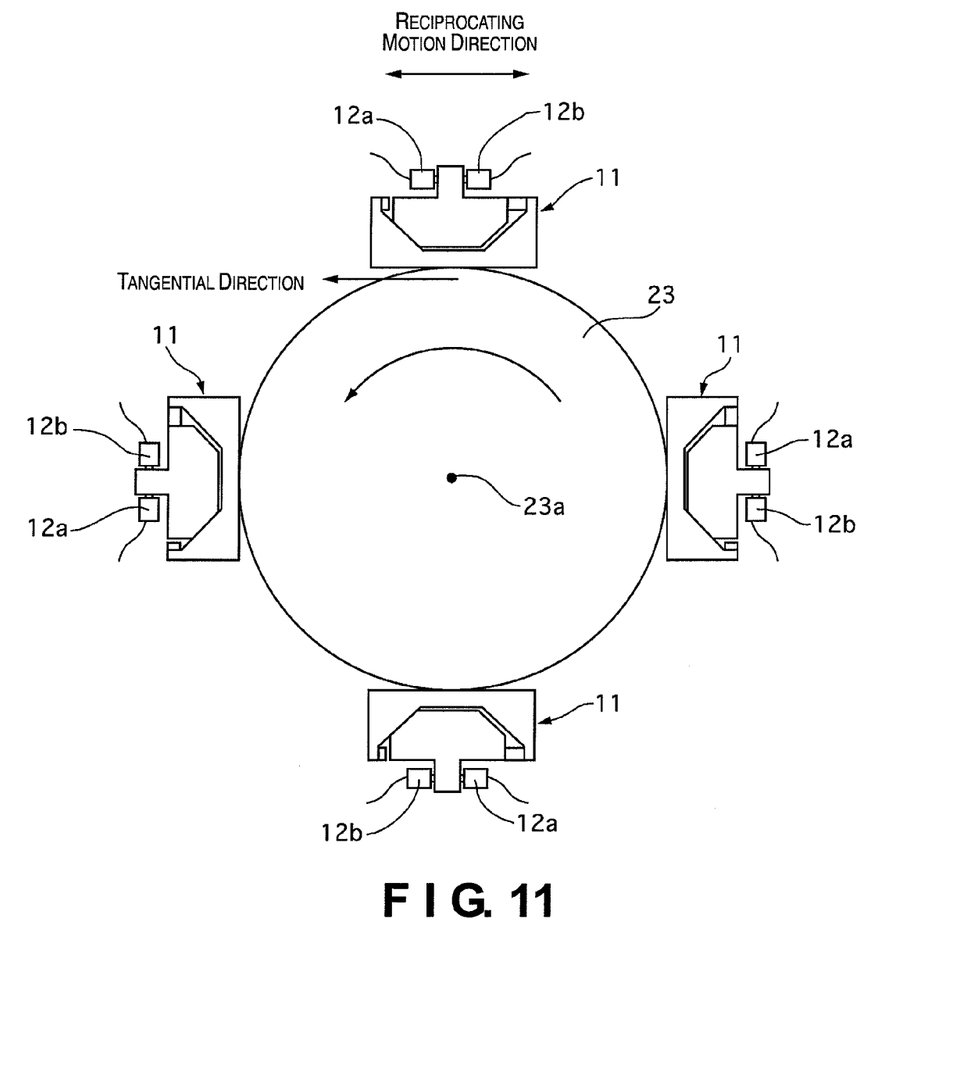
FIG. 11 is a simplified front elevational view of a driving device in accordance with a seventh embodiment of the present invention.

Referring now to FIG. 11, a driving device in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

The driving device of the seventh embodiment is similar to the driving device of the second embodiment except that the driving device of the seventh embodiment includes a driven member 23 arranged as a rotation body, a plurality of driving units 11 and a plurality of piezoelectric elements 12a and 12b.

FIG. 11 is a simplified front elevational view of the driving device of the seventh embodiment. As shown in FIG. 11, the driving device of the seventh embodiment includes the driven member 23, four of the driving units 11 and four pairs of the piezoelectric elements 12a and 12b. In the seventh embodiment, the driven member 23 has a cylindrical body configured and arranged to rotate around a rotational axis 23a. The driving units 11 contact with the outer circumference surface of the driven member 23 with the driving units 11 being arranged with a 90° pitch.

The direction of the reciprocating motion of each of the driving units 11 is set to be a tangential direction in the rotational movement of the driven member 23. Thus, the driving forces that are generated by the driving units 11 become the momentum that rotates the driven member 23. Therefore, it is possible to obtain a rotational output with the driving device of the seventh embodiment. In other words, the driving device of the present invention can be used as a rotation actuator as in the seventh embodiment instead of the linear actuator as in the first thorough sixth embodiments.

In addition to the similar effects obtained by the driving devices of the first and second embodiments, the driving device of the seventh embodiment can obtain a rotational output without adding additional mechanisms by providing the driven member 23 that rotates around the rotational axis 23a and setting the direction of the reciprocating motion of each of the driving units 11 to be a tangential direction in the rotational movement of the driven member 23.

Although the driving device of the present invention has been described based on the first through seventh embodiments, specific configurations are not limited to these illustrated embodiments. For example, the drive source is not limited to the piezoelectric element or elements, and an electromagnetic solenoid, a shape memory alloy, an ionic polymer as well as other actuators and the like, can be used as the drive source to carry out the present invention. In addition, conventional cam mechanisms other than the cam surfaces in the illustrated embodiments can be used as a mechanism that converts a portion of the driving force into the pressing force.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A driving device comprising:
   at least one drive source configured and arranged to generate a driving force;
   at least one driving unit operatively coupled to the drive source to move with a reciprocating motion between first and second directions by the driving force from the drive source, the at least one driving unit having a first member with a first cam surface and a second member with a second cam surface with at least one of the first and second cam surfaces including an incline plane that is inclined with respect to the first and second directions; and
   a driven member frictionally engaged with the second member of the driving unit to move in the first direction in response to the reciprocating motion of the driving unit,
   the driving unit being further arranged with respect to the driven member to apply a first pressing force acting on the driven member in a direction substantially perpendicular to the first and second directions when the first cam surface contacts the second cam surface to cause the second member to contact the driven member to generate the first pressing force when the driving unit moves in the first direction, and to apply a second pressing force that is smaller than the first pressing force acting on the driven member in a direction substantially perpendicular to the first and second directions when the driving unit moves in the second direction.

2. The driving device as recited in claim 1, wherein the driving unit is configured and arranged to apply the second pressing force at a value of zero when the driving unit moves in the second direction.

3. The driving device as recited in claim 1, wherein the driving unit is configured and arranged to selectively switch a movement direction of the driven member between the first and second directions.

4. The driving device as recited in claim 1, wherein at least one of the driving unit and the driven member is configured and arranged to cancel out a reaction force of the pressing force.

5. The driving device as recited in claim 1, wherein the driving unit includes a pressing force generating part configured and arranged to generate the pressing force imparted to the driven member.

6. The driving device as recited in claim 1, wherein the driving unit is further configured to apply the first pressing force when a relative speed of the driving unit with respect to the driven member in the first direction is a positive value, and to apply the second pressing force when the relative speed is a negative value or zero.

7. The driving device as recited in claim 6, wherein the first member is coupled to the drive source and the second member is frictionally engaged with the driven member, the second cam surface facing the first cam surface, and the first and second cam surfaces being configured and arranged to apply the first pressing force when a relative speed of the driving unit with respect to the driven member in the first direction is a positive value.

8. The driving device as recited in claim 7, wherein the first member includes a first force transmitting surface and the second member includes a second force transmitting surface facing the first force transmitting surface, the first and second force transmitting surfaces being configured and arranged to transmit the driving force from the first member to the second member when the relative speed of the driving unit with respect to the driven member is a negative value in the first direction.

9. The driving device as recited in claim 1, wherein the drive source includes a piezoelectric element.

10. The driving device as recited in claim 9, wherein the piezoelectric element is configured and arranged to be driven by a voltage waveform of a sinusoidal wave.

11. The driving device as recited in claim 1, wherein the drive source is configured and arranged to move the driving unit such that the driving unit and the driven member move in a resonance motion.

12. The driving device as recited in claim 1, wherein the at least one driving unit includes a plurality of driving units configured and arranged to move the driven member, and
the at least one drive source includes a plurality of drive sources respectively coupled to the driving units.

13. A driving device comprising:
   at least one drive source configured and arranged to generate a driving force;
   at least one driving unit operatively coupled to the drive source to move with a reciprocating motion between first and second directions by the driving force from the drive source; and
   a driven member frictionally engaged with the driving unit to move in the first direction in response to the reciprocating motion of the driving unit, the driven member being rotatable about a rotational axis, and the driving unit being moveable in the first and second directions that are tangential directions of a rotational movement of the driven member, the driving unit being further arranged with respect to the driven member to apply a first pressing force acting on the driven member in a direction substantially perpendicular to the first and second directions when the driving unit moves in the first direction and to apply a second pressing force that is smaller than the first pressing force when the driving unit moves in the second direction.

14. A driving device comprising:

driving force generating means for generating a driving force;

driving means for moving a driven member with a reciprocating motion between first and second directions by the driving force generated in the driving force generating means; and force applying means for applying a first pressing force acting on the driven member in a direction substantially perpendicular to the first and second directions when the driving means moves in the first direction and to apply a second pressing force acting on the driven member in a direction substantially perpendicular to the first and second directions that is smaller than the first pressing force when the driving means moves in the second direction.

15. A driving method comprising:

generating a driving force;

moving a driving unit having a first member with a first surface and a second member with a second surface with a reciprocating motion between first and second directions by the driving force, at least one of the first and second surfaces including an inclined plane that is inclined with respect to the first and second directions; and applying a first pressing force on a driven member engaged with the second member of the driving unit in a direction substantially perpendicular to the first and second directions when the driving unit moves in the first direction and to apply a second pressing force acting on the driven member in a direction substantially perpendicular to the first and second directions that is smaller than the first pressing force when the driving unit moves in the second direction.

\* \* \* \* \*